(12) United States Patent
von Brandt et al.

(10) Patent No.: US 8,203,989 B2
(45) Date of Patent: Jun. 19, 2012

(54) DISTRIBUTING CONTENT IN A COMMUNICATION NETWORK

(75) Inventors: Achim von Brandt, Munich (DE); Natalia Miettinen, Espoo (FI); Roman Pichna, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 610 days.

(21) Appl. No.: 12/453,669

(22) Filed: May 18, 2009

(65) Prior Publication Data

US 2010/0118758 A1 May 13, 2010

(30) Foreign Application Priority Data

May 16, 2008 (EP) .................................... 08009086

(51) Int. Cl.
*H04Q 7/20* (2006.01)
*H04L 12/43* (2006.01)
*H04H 20/17* (2006.01)

(52) U.S. Cl. ........ 370/312; 370/342; 370/390; 370/462; 455/412.2; 455/552.1

(58) Field of Classification Search .......... 370/312–493; 455/412.1, 412.2, 552.1
See application file for complete search history.

(56) References Cited

U.S. PATENT DOCUMENTS

| 8,068,511 | B2 * | 11/2011 | Reznik et al. ................. 370/447 |
| 2005/0249142 | A1 | 11/2005 | Kim et al. |
| 2006/0135127 | A1 * | 6/2006 | Aarnio et al. .............. 455/412.1 |
| 2006/0239265 | A1 * | 10/2006 | Son et al. ...................... 370/390 |
| 2008/0008176 | A1 | 1/2008 | Lim et al. |
| 2008/0051026 | A1 | 2/2008 | Kim et al. |
| 2008/0056219 | A1 | 3/2008 | Venkatachalam |

OTHER PUBLICATIONS

Armitage G. Belcore, request for comment 2022, "Support for Multicast over UNI 3/0/3, 1 based ATM Networks", Nov. 1996.
3GPP 3rd Generation partnership Project, Technical Specification, 25.346, V8.1.0, (Mar. 2008) "Introduction of the Multimedia Broadcast Multicast Service (MBMS) in the Radio Access Network (RAN), stage 2, Release 8, describes techniques for transmission of MBMS bearer service in UTRA (Universal Terrestrial Radio Access) such as point-to-multipoint transmission, selective combing and transmission mode selection beween point-to-multipoint and point-to-point bearer."

* cited by examiner

*Primary Examiner* — Afsar M. Qureshi
(74) *Attorney, Agent, or Firm* — Staas & Halsey LLP

(57) ABSTRACT

A method involves determining a first content identifier for content and determining a second content identifier for the content, wherein the first content identifier belongs to a first system layer and the second content identifier belongs to the second system layer. The method further involves requesting for delivering of the content by transmitting the first content identifier in a control message, wherein the control message belongs to a second system layer. The content is received via radio interface within a connection, wherein the connection belongs to the second layer. The second system layer is lower than the first system layer.

14 Claims, 3 Drawing Sheets

DISTRIBUTING CONTENT IN A COMMUNICATION NETWORK

CROSS REFERENCE TO RELATED APPLICATIONS

This application is based on and hereby claims priority to EP Application No. EP08009086 filed on May 16, 2008, the contents of which are hereby incorporated by reference.

BACKGROUND

The present invention relates to the technical field of communication networks. There is a desire to distribute content, to a program element for distributing content, to a computer-readable medium, to a mobile station, to a base station and to a use of a dynamic service message.

The use of communication networks grows. More and more content will be provided via different kind of communication media. And more and more people may use the network for accessing different kind of contents. It may not be foreseeable which different kinds of contents will be offered within the communication networks.

However, a differentiation between the content may be made in the way, how the content may be accessed. Some content may be accessed by an individual access of the user. Some content may exist, which is accessed by a plurality of users at the same time. The plurality of users accessing this same content may be located at a close-up range. Thus, the content on the way to the user may share the same physical lines. Therefore, network infrastructure may have been developed, which allows establishing a so-called multicast. A multicast distributes content for a plurality of users sharing a single link. Thus, a multicast may save network resources.

The content of the web address http://en.wikipedia.org/wiki/Multicast_address discloses IPv4 (Internet Protocol version 4) and IPv6 multicast addresses.

An electronic program guide (EPG/ESG) is known from the content of the web address http://en.wikipedia.org/wiki/Electronic_program_guide.

Armitage G., Belcore, request for comment 2022, "Support for Multicast over UNI 3.0/3.1 based ATM Networks", November 1996, describes mapping a connectionless IP multicast service over the connection oriented ATM services provided by UNI 3.0/3.1.

The document 3GPP ($3^{rd}$ Generation partnership Project) TS (Technical Specification) 25.346, V8.1.0, (2008-03), "Introduction of the Multimedia Broadcast Multicast Service (MBMS) in the Radio Access Network (RAN), stage 2, Release 8, describes techniques for transmission of MBMS bearer service in UTRA (Universal Terrestrial Radio Access) such as point-to-multipoint transmission, selective combining and transmission mode selection between point-to-multipoint and point-to-point bearer.

The document EP 1 718 097 A1 describes a broadcast service connection setup method comprising sending a connection setup request for a particular broadcast service to a Base Station and receiving a first identifier mapped to the particular broadcast service and second identifiers individually mapped to at least one content broadcast, the first and second identifiers being allocated from the Base Station.

Since more and more services are also used by mobile terminals (MT) or mobile stations (MS) a more effective use of an air interface may be necessary.

SUMMARY

The inventors propose a method for distributing content. The method involves determining a first content identifier for a content. The method further comprises determining a second content identifier for the content. The first content identifier belongs to a first system layer. The second content identifier belongs to a second system layer. Delivering the content is requested by transmitting the first content identifier in a control message, wherein the control message belongs to the second system layer.

The method further comprises receiving the content via a radio interface within a connection, wherein the connection belongs to the second system layer. The content at that second layer is identified using the second content identifier. The same content is identified by the first identifier at the first layer.

Determining the second content identifier may comprise receiving the second content identifier from a Base Station, from a network or from an infrastructure.

The second system layer is lower than the first system layer.

A system layer may be a system layer in the sense of the OSI (Open System Interconnection) system layer model. The first system layer may substantially correspond to the OSI layer 3 (OSI network) or L3 and the second system layer may correspond to layer 2 (OSI link) or L2. Thus, the first system layer may be on a higher OSI layer than the second system layer.

The terms "first system layer" and "second system layer" may be used as names in this text.

The first content identifier may be an IP multicast address of a TV (television) channel stream. In other words, the first content identifier may be an address of a flow or of a service flow. E.g. an IP multicast address may be used to address a flow. The flow may be addressed with a single address. The first content identifier may be used to identify a content on the Mobile Station (MS) side.

Furthermore, a third content identifier may be used in order to describe the content on the MS side for a user. E.g. a user may use a TV channel number or a TV channel name in order to select corresponding program content. The third identifier may relate to the first identifier and/or to the second identifier. Thus, a user or an MS selecting a TV channel number may send a corresponding IP multicast address (first content identifier) to the BS, which BS may reply with a corresponding Connection identifier (CID) or MCID (second identifier).

The first content identifier may be an address of the content and may allow localising the content or the flow, e.g. within a network (NW) or on the BS side. Thus, the first identifier may also relate to the content, wherein the relation may differ from the relation of the third content identifier to the content. However, the first content identifier and the second content identifier may be also related one to another.

It may also be assumed, that the first content identifier and the second content identifier belong to different system layers. The first content identifier may belong to the first layer, which is above the second system layer. The second content identifier may belong to the second system layer.

The connection transporting the content may be varied dynamically. In other words, this connection including the content may be multiplied by dynamically adding, changing or deleting further connections. Thus, once a connection transporting a predefined content may have been established, a further user may use this connection.

A content identifier may be adapted to identify a content.

According to another aspect, the inventors propose that a program element for distributing content is provided. The program element comprises the program code wherein the program code, when being executed by a processor is adapted to carry out the method of distributing a content.

A Base Station and the infrastructure connected to it may distribute content to a Mobile Station (MS) on the request of the MS.

According to another aspect, the inventors propose that a computer-readable medium is provided, the computer-readable medium comprising a program code, wherein the program code, when being executed on a processor, is adapted to carry out the method of distributing content.

A computer-readable medium may be a floppy disk, a hard disk, an USB (Universal Serial Bus) storage device, a RAM (Read Access Memory), a ROM (read only memory) and an EPROM (Erasable Programmable Read Only Memory).

According to yet another aspect, the inventors propose that a mobile station (MS), a mobile terminal or a user equipment (UE) is provided. The MS comprises a memory, a requesting device and a receiving device. The memory is adapted to store a first content identifier and/or to store a second content identifier for corresponding content. The first content identifier belongs to a first system layer and the second content identifier belongs to a second system layer. The requesting device is adapted for requesting for delivering the content by transmitting the first content identifier in a control message, wherein the control message belongs to a second system layer.

The receiving device is adapted for receiving the content via radio interface, wherein the content is transported via a connection, which connection belongs to the second system layer. The receiving device is further adapted to identify the content by the first content identifier and the second content identifier. The second system layer is lower in the OSI hierarchy than the first system layer.

The requesting device may send a request to a Base Station or via Base Station to the connected infrastructure and nodes within it, to a content dispatcher or to a content distributor, which may set up a connection to the content provider and to the destination of the content, e.g. an MS.

According to another aspect, the inventors propose that a Base Station, a network element, a network node, a network, which may be connected to a Base Station or an infrastructure connected to a Base Station is provided, the Base Station and/or the connected infrastructure comprise a receiving device, a mapping device and a transmitting device. The receiving device is adapted to receive a message, which requests the delivery of content. The message comprises a first content identifier. The first content identifier belongs to a first system layer.

The mapping device is adapted to map in the Base Station the content to a connection belonging to a second system layer. The connection is identified by a second content identifier, e.g. a connection identifier (CID) and/or a multicast connection identifier (MCID).

The transmitting device is adapted to transmit the content via a radio interface inside the connection, wherein the second system layer is lower in the OSI hierarchy than the first system layer.

The connection identifier and the content identifier may allow an MS accessing a desired content directly on the air interface. Thus, the MS may subscribe to a signal received in the air interface.

According to another aspect, the inventors propose that the use of a Dynamic Service (DSx) Messages for transmitting a first content identifier is provided. The first content identifier belongs to a first system layer, wherein the system layer the Dynamic Service Message belongs to is lower than the first system layer. The Dynamic Service Message belongs to the second system layer. An IP multicast address may be transported by the Dynamic Service Message.

A network for distributing content may be used to distribute multicast and broadcast services (MCBCS).

MCBCS (Multicast Broadcast Service) may allow a plurality of usage scenarios. In the following some examples of usage scenarios provided by MCBCS are described.

Streaming may be a local streaming broadcast, like advertising with music and television (TV). The program may be distributed locally through broadcast. An end user may attend an event like a trade show, a concert or a sporting game and may want to receive a broadcast/multicast of advertisement, event introduction or other relevant events (e.g. football game). These events may happen concurrently. The information or content may be delivered based on a registered users' profile through users' pre-operation, for example age, gender.

Furthermore, the streaming service may allow a stream broadcast or multicast of the program. The stream may be delivered over broadcast multicast channel, and may be delivered based on registered users' profile.

Another example for an MCBCS service may be online gaming, wherein a subscriber may play a game, which is at a central server with one or more subscribers. The action result of one player may be distributed to all the players.

Further examples for MCBCS services are push to talk, file downloading, pre-scheduled or static broadcast multicast file downloading, alert, video podcasting or audio podcasting, interactive TV, real time monitoring, multiparty conference call, interactive TV-VOD (video on demand).

An interactive TV, which may comprise a voting application with real time streaming video or audio services may offer a variety of video and audio content channels from which users may choose. The content may require continuous transmission and may be streamed at a pre-scheduled time dictated by a service provider. The stream may be streamed over a dedicated broadcast/multicast channel to a larger number of audiences. The subscriber may involve in a TV program in which the outcome of a show is dependent of the voting from the user.

A service may be an actual stream. A guide or an MCBCS service guide may help controlling the stream. An example for an MCBCS service guide is an electronic service guide (ESG), AN interactive program guide (IPG) or an electronic program guide (EPG). An EPG may be an on-screen guide to schedule broadcast television or radio programs which may allow a viewer to navigate, select and discover content of a television program by time, title, channel, genre, etc.

The ESG information or a corresponding content identifier may be mapped to an OSI L2 (layer 2) multicast connection ID (MCID). It may also possible to carry ESG information in an OSI L2 connection and to carry L2 information in ESG.

ESG information may be mapped to OSI layer 2. In order to receive MCBCS flows, a terminal may have to map higher layer information, e.g. information of an ESG, to low layer information for the radio interface. The radio interface in WiMAX (Worldwide Interoperability for Microwave Access) is called R1 interface. ESG may include human readable information about program channels. This information and the lowest layer of information for ESG may be at layer 3 (L3). The layer 3 information may be included in SDP (Session description protocol). SDP may be used for describing multimedia sessions for the purpose of session announcement, session invitation and other forms of multimedia session initiation.

SDP may be used for describing IP layer session and higher layer session.

One option for linking L3 (layer 3) ESG information with L2 (layer 2) information may be to include L2 information in the ESG.

Another option may be to include higher layer information, in particular L3+, i.e. layer 3 and above, in the L2 signalling.

The first system layer may be layer 3 and the second system layer may be layer 2. Having a first content identifier for a content and having a further content identifier for this content may allow to identify the content in a mobile station and the Base Station (BS).

Furthermore, a second content identifier may also be used for identifying a corresponding content in the Base Station.

The first content identifier and/or a further content identifier may be mapped to a layer 2 connection identifier (CID) and thus may allow accessing the content on system layer 2, i.e. by using L2 protocols.

The information provided on a radio interface, like the R1 interface, may be accessible by a plurality of MSs. Having the information about layer L2 information of the content, like the corresponding identifiers, may allow any terminal receiving the signal, i.e. the physical radio signal comprising the layer L2 information and the content. In other words, knowing information about L3 or higher layer connections of the content only may not allow directly accessing the signal and forking the signal to the MS.

Having layer L2 information like a unicast (UC) ID or a connection ID (CID) or a multicast CID (MCID) may allow accessing the layer 2 information including higher layer information. In order to protect such a connection, an encryption method may be employed like an SA (Security Association).

Thus, for example if an MS may know that a broadcast or multicast information is contained in a certain time slot, by having information about the position of the time slot in the air may enable the MS to access for example this certain time slot including all the information which it may comprise. Thus, by accessing layer 2 connection at the same time also the desired higher layer information may be available.

Using a multicast on layer 2 via the air interface may save resources on the air interface. Accessing the same content with unicast connections, i.e. every MS may have an individual connection to the same content, may allocate additional resources on the air interface. With an increasing number of users accessing the same content a critical number or a limit of user may be reached which may make it more effective sharing the air resources.

An IP multicast (L3 layer) or a higher layer multicast may only be realized within a router. To benefit from multicast at higher layer, all lower layers below may have to support multicast as well.

Employing L2 multicasts across radio interface may allow using the benefits of IP (L3) multicast also in the radio interface.

Thus, using an L2 multicast may be more effective than using a layer L3 multicast transported by L2 unicast in the radio interface. Thus, mapping layer 3 information, like a first content identifier and a further content identifier or a third content identifier, with layer 2 information, like a second content identifier, e.g. the unicast CID or the multicast MCID, may allow combining accessing higher layer content multicast or broadcast with lower layer multicast or broadcast and may allow effectively using the air interface.

In the following, further aspects of the method for distributing the content will be described. These aspects may also apply for the program element, the computer-readable medium, the mobile station, the base station and the use of a dynamic service message.

According to a further aspect, the inventors propose that the content is transported in a flow or in a service flow. A service flow may be a unicast flow, a multicast flow or a broadcast flow.

The flow may be a broadcast service which a user or an MS may desire to access to.

According to a further aspect, the inventors propose that the first content identifier is a multicast address, e.g. a L3 multicast address or an IP multicast address. The second content identifier is a multicast or a unicast address, e.g. L2 unicast (layer 2 unicast) or L2 multicast (layer 2 multicast).

An IP multicast (IP-M) address (IP-M@) may be a part of information carried in ESG. An IP multicast address or an IP-M@ may allow to select a channel of a flow. An IP multicast address may also allow to access a newspaper for downloading the content of the newspaper. In other words, the content identifier like an IP multicast address may allow accessing the content or localising the content within a network.

According to a further aspect, the inventors propose that the second content identifier is an L2 multicast identifier or an L2 unicast identifier.

According to yet another aspect, the inventors propose that receiving the content comprises mapping in a Base Station or in a connected network and/or infrastructure the content to the connection, wherein the content is identified by the first content identifier and wherein the connection is identified by the second content identifier, e.g. by a connection identifier (CID) and/or a multicast connection identifier (MCID).

Such a mapping may allow providing a connection between L3 and L2, i.e. it may allow mapping or relating higher layer information with lower layer information.

According to another aspect, the inventors propose that receiving the content further comprises mapping in a Mobile Station the first content identifier (IP multicast address) to the connection identified by the second content identifier, e.g. by the connection identifier (CID) and/or by the multicast connection identifier (MCID).

The mapping of a layer 2 connection, identified by the CID or MCID to a content identifier may also allow on the mobile station side making a mapping between L3 and L2 information.

Thus, within the MS a TV channel may be mapped to a layer 2 connection transporting the corresponding program of the TV channel.

According to yet another aspect, the inventors propose that the method further comprises deciding within the base station or within the attached infrastructure or within the network about using a connection identifier or a multicast connection identifier for the connection.

Thus, the base station may decide starting from which count of users a more efficient use of a multicast connection may be possible instead of using a unicast connection for each MS accessing the same content. A unicast connection may be identified by a CID and the multicast connection may identified by an MCID. The Base Station may also change a unicast connection into a multicast connection. Such a change however, the base station may have to communicate or indicate to the MS connected to the corresponding CID connection.

According to another aspect, the inventors propose that the mobile station transmits the control message.

Thus, MS initiated L2 procedure may be provided.

According to another aspect, the inventors propose that the base station transmits the control message.

Thus, BS initiated L2 procedure may be provided.

According to another aspect, the inventors propose that the content is accessed by a data path.

The data path may be a connection in the back bone or the core network to access the content, in particular to access the content provider and to transport the content to the corresponding base station. Once the content may be arrived in the BS the content may be distributed to the MSs.

According to another aspect, the inventors propose that the dynamic service message may be at least one of the group of IEEE 802.16 (Institute of Electrical and Electronics Engineers) dynamic service messages including dynamic service addition, dynamic service change and dynamic service deletion.

It has to be noted that aspects and embodiments have been described with reference to different subject-matters. In particular some aspects have been described with reference to an apparatus whereas other embodiments have been described with reference to a method. However, the person skilled in the art will gather from the above and the following description that unless notified in addition to any combination features belonging to one type of subject-matter also any combination between features relating to different subject-matters in particular between features of the apparatus and the features of the method is considered to be disclosed with this application.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
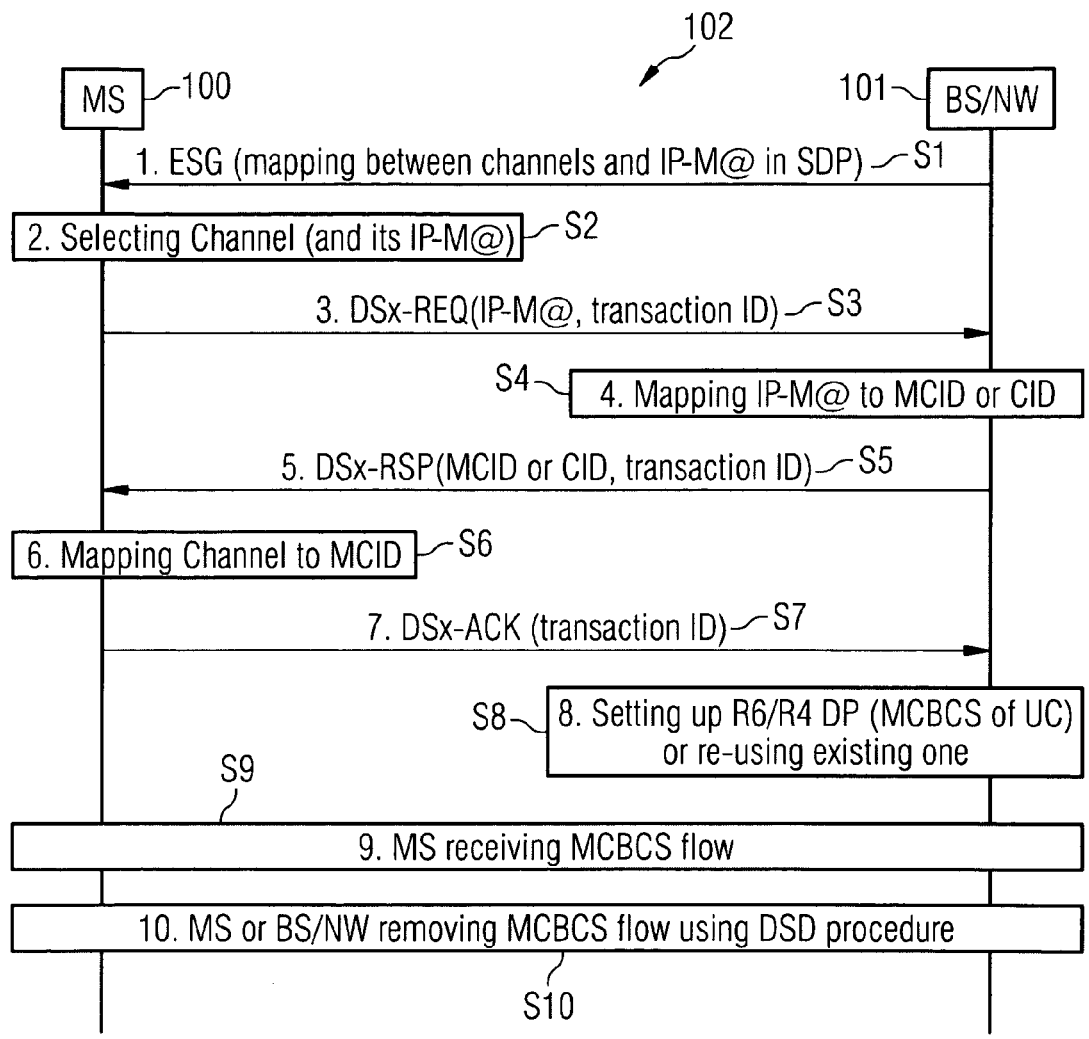
FIG. 1 shows a message flow diagram for an MS initiated L2 service flow setup procedure, which is extended to provide an ESG to L2 mapping according to an exemplary embodiment of the proposed methods and devices.

Reference will now be made in detail to the preferred embodiments of the present invention, examples of which are illustrated in the accompanying drawings, wherein like reference numerals refer to like elements throughout.

FIG. 1 shows a message flow diagram for an MS initiated L2 service flow setup procedure which is extended to provide ESG to L2 mapping. An MCBCS, in particular the ESG information, is mapped with a layer 2 (L2) connection. Such ESG for example is a television program.

A higher layer MCBCS information, e.g. an IP multicast address or an IP-M@, is packed in an DSx (Dynamic Service Addition, Dynamic Service Change or Dynamic Service Deletion) message and to an R4/R6 data path.

The MCBCS is used in a WiMAX network. During the service discovery an IP multicast address is used to identify a corresponding service. This identification may be received by various ways, e.g. from a http (Hypertext Transfer Protocol) connection or an USB dongle.

At the radio interface R1 the service has also to be identified by the corresponding identifier. However, access to higher layer services may not be directly possible on the radio interface. Thus, an identification which corresponds to the higher layer identifier has to be made on MAC level (Media Access Control). Such a MAC level or L2 identifier may be a unicast ID or connection ID (CID). Thus, a mapping of the higher layer identifier to the L2 identifier may allow a plurality of MSs accessing to a single stream.

It may be seen as a general idea to create a mapping between a multicast IP address and a CID or MCID. I.e., the first content identifier is mapped to the second content identifier. This mapping is signalled to the MS in order to inform the MS about this relationship existing within the network side or within the BS. Thus, the MS may access the higher layer information via the corresponding L2 identifier.

The MS initiated L2 procedure may comprise signalling an IP multicast address in a DSx exchange, which DSx exchange or DSx transmission is initiated by the MS. The signalling of the IP multicast address via a DSx message may help identifying the multicast flow.

The method further comprises reusing an IP classifier TLV (type, length, value) of a DSx message for carrying or transporting the IP multicast address in a DSx-REQ (DSx Request) from the MS to the BS. The DSx message is a layer 2 message.

The IP multicast address sent by the DSx-REQ message from MS to BS is mapped to an existing or a newly created MCID or CID in the BS.

Furthermore, the channel information (for example information about a program channel or the number of the TV channel received via ESG) is mapped to this MCID or CID based on an DSx transaction ID in the MS. The transaction ID may correspond to the first content identifier.

The stream information may be a third content identifier. The stream information for example is a channel information such as the TV program name or the TV channel number in a case the stream is a TV-program. This third content identifier belongs to a system layer, which is higher then the system layer the second content identifier belongs to. The third content identifier may comprise information received in SDP. The third content identifier can be kept in the MS and may allow identifying the corresponding content.

Thus, from SDP may the first content identifier and the third content identifier be arrived for the same content. The third content identifier may help identifying the content in the MS, whereas the first content identifier may help identifying the content within the network infrastructure or the BS.

The third content identifier relates to the content and/or to the first content identifier and/or to the second content identifier. The first content identifier and the third content identifier may belong to the same system layer.

Furthermore, the IP multicast address is mapped to an existing or a newly created R4/R6 data path (DP) to connect to a multicast or to broadcast or to a unicast flow.

In a BS initiated L2 procedure an IP multicast address is signalled in an DSx message exchange from the BS to the MS, in order to identify a corresponding multicast flow.

The IP multicast address is mapped to an existing or a newly created MCID or CID in the BS.

Furthermore, the IP multicast address is mapped to an existing or newly created R4/R6 DP to an MCBCS or an UC.

For transporting or carrying the IP multicast address from the BS to the MS an IP classifier TLV field in an DSx-REQ message is used.

The channel information, for example the information contained in EPS is mapped in the MS to the MCID or CID based on the IP multicast address. In particular, the first content identifier is mapped to the MCID or CID, i.e. the second content identifier.

Also the third identifier may be mapped to the second content identifier.

FIG. 1 shows the MS 100 which has a radio connection with the base station 101, and via the base station with the attached network or infrastructure 101. In the first step S1 the MS 100 receives ESG information including the IP multicast address. At least part of the MCBCS information contained in ESG may be in the SDP format. The ESG information may be received by browsing an TV browser providing a television program guide. The MS receives the IP multicast address corresponding to a television broadcast flow.

The MS may generate from the ESG the first content identifier and the second content identifier.

The ESG information of a TV channel, like an IP multicast address of the corresponding stream or flow, may be the first content identifier and the CID or MCID may be a second content identifier. Both identifiers relate to the same content, which content may be transported via a layer 2 connection identified by CID or MCID.

In step S2 the user of MS 100 selects the desired channel, in particular a TV channel, of the TV program based on the human readable information contained in ESG, e.g. in an ASCII text or on a user interface. The user may select the channel by clicking on a corresponding entry on the user interface. The selected channel may be stored as a third content identifier. By clicking on a web page the user, in particular the MS 100 also receives the IP multicast address associated with the corresponding TV program or TV channel.

In step S3 the MS 100 signals the IP multicast address to the BS 101 by using a DSx L2 message. The DSx message may be Dynamic Service Addition (DSA) or Dynamic Service Change (DSC).

In step S4 the BS 101 or network 101 maps the IP multicast address (IP-M@) to an existing MCID or the BS/NW 101 allocates a new MCID. The BS 101 or the network infrastructure 101 can choose to allocate a unicast identifier (CID) instead of selecting an MCID. If the number of users which simultaneously access the layer 2 connection comprising the desired higher level content is below a predefined limit, it may be more efficient in order to conserve radio resources to install the unicast connections CID. In particular a CID is provided if there are not enough MSs receiving the multicast flow.

In step S5 the BS signals to the MS the corresponding MCID or CID from step S4 within DSx-RSP (DSx Response) message.

In step S6 by selecting a channel and the corresponding IP-M@ the MS can map the MCID and CID respectively to the selected channel. In step S6 the transaction ID is used to generate the mapping, in order to identify corresponding DSx messages.

The transaction ID relates or links corresponding DSx-REQ, DSx-RSP and DSx-ACK one to another. This allows correct mapping of streams if a terminal concurrently requests multiple instances of them.

In step S7 the DSx message transfer is concluded and an DSx-RSP (DSx Response) is sent to the BS 101.

In step S8 the BS 101 or the network infrastructure 101 sets up or reuse an existing R4/R6 data path within Access Service Network (ASN) or base station (BS) and ASN-GW and/or between multiple ASN-GWs within the access network. A DSx-ACK (DSx-Acknowledge) is sent from the MS 100 to the BS 101. It is to be noted that S8, although in this embodiment is placed after S7, can be executed in any step between steps S4 and S9.

In step S9 by mapping the channel within MS 100 to the MCID or CID and mapping the corresponding MCID or CID to the IP multicast address within the BS/NW 101 the MS 100 receives the corresponding MCBCS flows. The MCBCS flows may be an online newspaper, an online video on demand service or an ESG service.

In step S10 the MS 100 or the BS 101 can initiate removing the MCBCS flow across the radio interface using the DSD (Dynamic Service Deletion) procedure.

Step S1 to step S8 and step S10 relate to the management or to the control for a user channel. The user channel is used in step S9. Management traffic uses unicast L2 connection but the user traffic can use either unicast or multicast layer 2 connection on the air interface.

Figure 2:
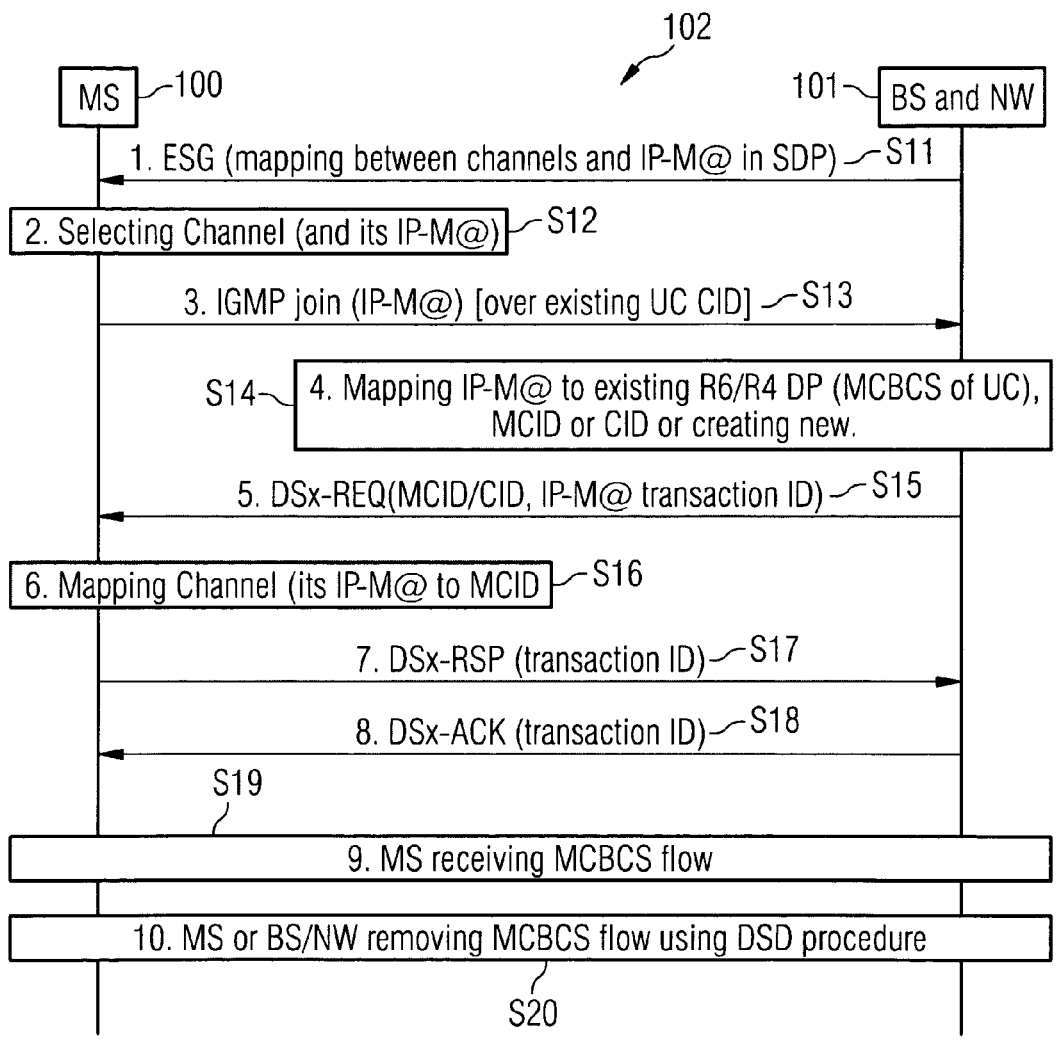
FIG. 2 shows a message flow diagram for a BS initiated L2 service flow setup procedure, which is extended to provide ESG to L2 mapping according to an exemplary embodiment of the present invention.

FIG. 2 shows a BS initiated L2 service flow setup procedure which is extended to provide mapping of information contained in ESG to L2. As in FIG. 1 the MS 100 is connected to the BS and NW (network or infrastructure) 101 via a radio link 102.

In step S11 the MS receives ESG information which may include an IP multicast address corresponding to a desired TV channel. The ESG information may comprise elements in SDP format which may comprise IP multicast address of the flow.

In step S12 the desired TV channel is selected and, since the IP address may be provided as part of an object in the SDP format, by selecting the desired channel a corresponding IP multicast address is also selected.

In step S13 the MS 100 now uses a higher layer protocol command to inform the BS and/or infrastructure connected to it 101 about the selected IP multicast address. In FIG. 2, the MS 100 may use the higher layer IGMP (Internet Group Management Protocol) join command with the IP multicast address as a parameter.

The MS 100 signals the selected channel over an existing unicast channel CID to the infrastructure 101 using an IP multicast address as the identifier of the channel. I.e. the channel now is associated with the corresponding identifier. For sending to the BS the IP multicast address for example the IGMP (Internet Group Management Protocol), the MLD (Multicast Listener Discovery) or HTTP (Hypertext Transfer Protocol) protocol can be used.

In step S14 the BS 101 or the infrastructure 101 maps the IP multicast address to an existing MCID or allocates a new MCID if no MCID exists in order to conserve radio resources. The BS 101 or the infrastructure 101 can choose to allocate a unicast identifier (CID) instead, i.e. if there are not enough MSs receiving the multicast flow. The BS 101 or the infrastructure 101 sets up or reuses an existing R4/R6 access network data path to connect to the MCBCS or the UC. It is noted that mapping the connection to a data path may also be executed between steps S14 and S19.

In step S15 the BS 101 signals the MCID or the CID and the IP multicast address to the MS 100 which information is comprised in the DSx-REQ message (DSA or DSC).

Based on the IP multicast address of step S15 in step S16 the MS 100 can map the MCID, i.e. the L2 identifier, to the selected channel. Again the transaction ID may help identifying corresponding messages.

In step S17 a DSx-RSP (DSx Response) message is sent from the MS 100 to the BS 101 comprising the transaction ID for this communication. The DSx-RSP message sets up the MCID or CID.

In step S18 the DSx-ACK message comprising the transaction ID is sent from the BS 101 to the MS 100. The DSx exchange procedure is concluded, i.e. signalling on layer 2 or on the control layer.

In step S19 the MS 100 receives the MCBCS flow and may use higher layer protocols within this flow or may use all protocol layers of this flow. Thus the MS 100 is not restricted to layer 2 information in the MCBCS flow.

In step S20 the MS 100 or the BS 100 can remove the MCBCS flow across the radio interface 102 using the DSD procedure.

Steps S11 to S18 and S20 relate to management functionality which setup a user channel. The user channel can be used in step S19. Step S20 releases the established user channel. The user channel allows accessing the flow via the L2 multicast.

Figure 3:
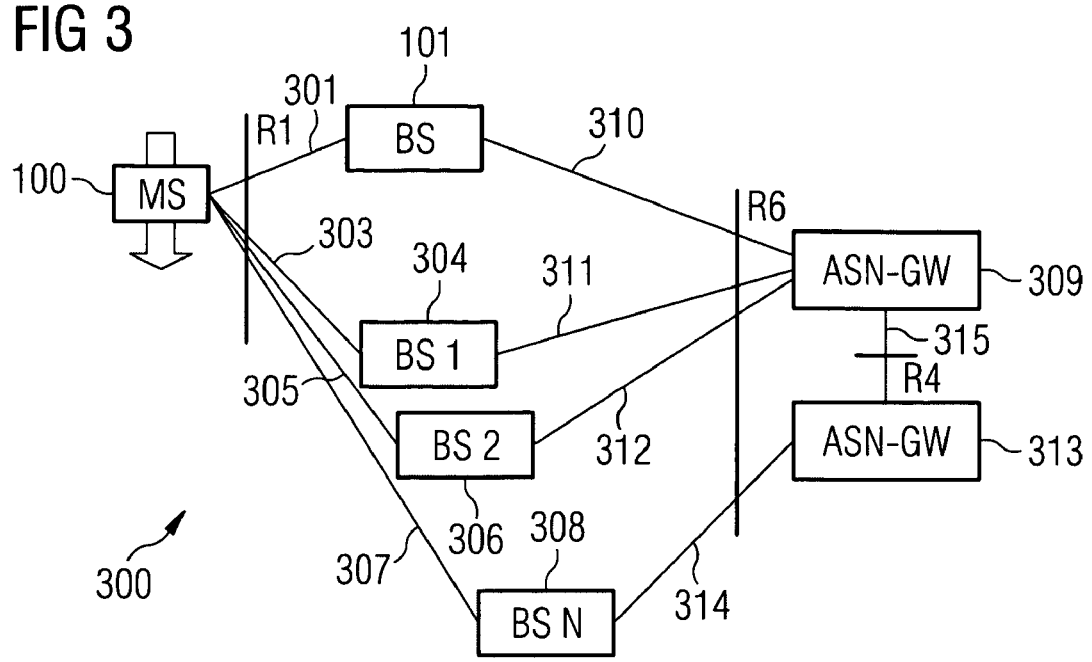
FIG. 3 shows an access network of a telecommunication system according to an exemplary embodiment.

FIG. 3 shows the access network of a telecommunication system according to an exemplary embodiment. The telecommunication system 300 or the telecommunication network 300 of FIG. 3 may be based on a WiMAX access network architecture.

The mobile station 100 is associated via the R1 interface 301 with the first Base Station 101.

The first Base Station 101 is connected to the first ASN-GW via the first R6 interface 310. The second base station 306 is connected to the first ASN-GW 309 via the second R6 interface 312. The n-th base station 308 is connected to the second ASN-GW 313 via the nth R6 interface 314. The first ASN-GW 309 and the second ASN-GW 213 are connected via the R4 interface 315.

Content may be accessed via a DP established via an ASN-GW 309, 313.

A connection between a Base Station 101, 304, 306, 308 and an ASN-GW 309, 313 may be a an optical, wired or a microwave link.

The Base Station 101 and the MS 100 may establish a MCBCS multicast.

Figure 4:
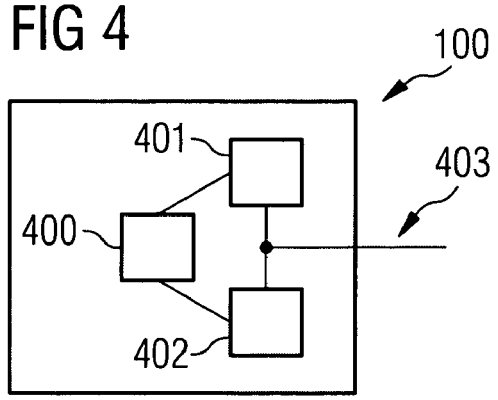
FIG. 4 shows an MS according to an exemplary embodiment.

FIG. 4 shows a mobile station according to an exemplary embodiment. The MS 100 comprises the memory 400, the requesting device 401 and the receiving device 402. The requesting device 401 and the receiving device 402 are connected to the interface 403, which may be a radio interface 403 or an R1 interface 403. This interface 403 may be implemented as an antenna 403.

The memory 400 is adapted to store a first content identifier and/or a second content identifier for identifying a content.

The memory 400 allows a mapping of layer 2 information in the form of MCID and/or CID to higher layer information like an IP-address of a TV channel. The TV channel may be the MCBCS flow which is desired by the MS 100, in particular by a user of MS 100. This TV channel is associated with the first content identifier, for example an IP multicast address.

The requesting device is adapted for requesting for the delivery of the content by transmitting the first content identifier in an DSX-REQ control message to the BS.

The receiving device 401 is adapted for receiving the desired content, for example the desired channel, via the radio interface 403.

This allows the MS 100 to map the desired channel or the desired stream or the desired flow to a layer 2 management message or control message.

The memory 400, the requesting device 401 and the receiving device 402 are physically connected. The requesting device 401 and the receiving device 402 are connected to the air interface 403.

Figure 5:
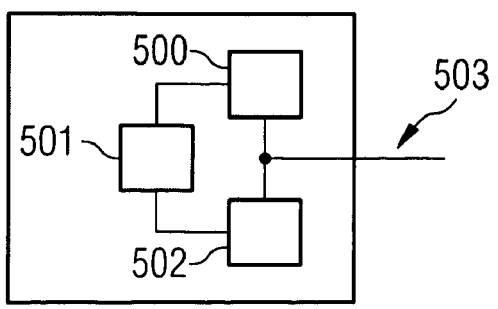
FIG. 5 shows a BS according to an exemplary embodiment.

FIG. 5 shows the base station 101 which comprises the receiving device 500, the mapping device 501 and the transmitting device 502. The receiving device 500, mapping device 501 and transmitting 502 are connected. The receiving device 500 and the transmitting 502 are connected to the air interface 503 or radio interface 503.

The receiving device 500 is adapted to receive a message requesting for delivering of a content. Receiving in a BS a corresponding IP multicast address in a layer 2 connection may be sufficient to trigger the BS to send a corresponding MCID/CID via a control message. In particular the receiving device is adapted to receive management information for establishing a user channel and to prepare a mapping from higher layer information to layer 2. The receiving device 500 receives a DSx-REQ message comprising an IP multicast address or an IGMP join message in order to request for delivering of a content. In particular, the IGMP join message or http may be received in a network element, e.g. in an ASN-GW 309, 313 or in a dedicated server, which is connected to the ASN-GW 309, 313. The function of the server may be distributed in the infrastructure, e.g. in a access network or core network.

In particular the DSx-REQ or the IGPM join message trigger the BS 101, in particular the network, to establish a connection via the layer 2 multicast connection.

The mapping device 501 is adapted to map within the base station 101 the content which is desired by an MS to a connection, which MS is not shown in FIG. 5. Furthermore, the mapping device maps the content to a corresponding connection identifier and a multicast connection identifier, in particular to a connection identified by a connection identifier or by a multicast connection identifier.

The transmitting device is adapted to transmit content via the radio interface 503 using a layer 2 connection.

It should be noted that the term "comprising" does not exclude other elements or steps and the "a" or "an" does not exclude a plurality. Also elements described in association with different embodiments may be combined.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The embodiments can be implemented in computing hardware (computing apparatus) and/or software, such as (in a non-limiting example) any computer that can store, retrieve, process and/or output data and/or communicate with other computers. The processes can also be distributed via, for example, downloading over a network such as the Internet. The results produced can be output to a display device, printer, readily accessible memory or another computer on a network. A program/software implementing the embodiments may be recorded on computer-readable media comprising computer-readable recording media. The program/software implementing the embodiments may also be transmitted over a transmission communication media such as a carrier wave. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

What is claimed is:

1. A method of distributing content, the method comprising:

determining a first content identifier for content, the first content identifier belonging to a first system layer;

determining a second content identifier for the content, the second content identifier belonging to a second system layer lower than the first system layer;

requesting delivery of the content by transmitting the first content identifier in a control message belonging to the second system layer at a requesting device;

receiving the content via a radio interface through a connection belonging to the second system layer at a receiving device; and identifying the content by the first content identifier and by the second content identifier.

2. The method of claim 1, wherein the content is transported in a flow.

3. The method of claim 1, wherein the first content identifier is an IP multicast address and/or the second content identifier is a multicast identifier or a unicast identifier.

4. The method of claim 1, wherein the receiving the content comprises:

mapping in a base station, in a connected network and/or in an infrastructure the content to the connection, the content being identified by the first content identifier and the connection being identified by the second content identifier.

5. The method of claim 4, wherein the receiving the content further comprises:

mapping in a mobile station the first content identifier to the connection, the connection being identified by the second content identifier.

6. The method of claim 1, further comprising:

determining within the base station, within the connected network and/or within the infrastructure to use a Connection Identifier or a Multicast Connection Identifier for the connection.

7. The method of claim 1, wherein a mobile station transmits the control message.

8. The method of claim 1, wherein a base station transmits the control message.

9. The method of claim 1, further comprising:

accessing the content via a data path.

10. A non-transitory computer-readable medium causing a processor to execute the method of claim 1.

11. A mobile station, comprising:

a memory storing a first content identifier and/or a second content identifier for content, the first content identifier belonging to a first system layer, the second content identifier belonging to a second system layer lower than the first system layer;

a requesting device requesting delivery of the content by transmitting the first content identifier in a control message, the control message belonging to the second system layer; and a receiving device receiving the content via a radio interface through a connection belonging to the second system layer, the receiving device identifying the content by the first content identifier and by the second content identifier.

12. A base station, comprising:

a receiving device receiving a message requesting delivery of content, the message including a first content identifier belonging to a first system layer;

a mapping device mapping in the base station the content to a connection belonging to a second system layer lower than the first system layer, the connection being identified by a second content identifier; and a transmitting device transmitting the content via a radio interface through the connection.

13. An apparatus, comprising:

a transmitting device transmitting a Dynamic Service message including a first content identifier for content to a receiving device, the first content identifier belonging to a first system layer, the Dynamic Service message belonging to a system layer lower than the first system layer.

14. The apparatus of claim 13, wherein the Dynamic Service message is at least one of the group of IEEE 802.16 Dynamic Service messages consisting of Dynamic Service Addition, Dynamic Service Change and Dynamic Service Deletion.

* * * * *